(12) United States Patent
Jeter, Jr. et al.

(10) Patent No.: US 7,290,096 B2
(45) Date of Patent: Oct. 30, 2007

(54) FULL ACCESS TO MEMORY INTERFACES VIA REMOTE REQUEST

(75) Inventors: Robert E. Jeter, Jr., Morrisville, NC (US); John W. Marshall, Cary, NC (US); Jeffery B. Scott, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 6 days.

(21) Appl. No.: 11/403,364

(22) Filed: Apr. 13, 2006

(65) Prior Publication Data

US 2006/0184753 A1 Aug. 17, 2006

Related U.S. Application Data

(63) Continuation of application No. 10/342,039, filed on Jan. 14, 2003, now Pat. No. 7,047,370.

(51) Int. Cl.
  *G06F 13/00* (2006.01)
  *G06F 12/00* (2006.01)
(52) U.S. Cl. ............... 711/154; 711/100; 711/167; 709/213
(58) Field of Classification Search ............. 711/100, 711/118, 154, 167; 709/213, 223, 230
See application file for complete search history.

(56) References Cited

U.S. PATENT DOCUMENTS

| | | | |
|---|---|---|---|
| 5,134,697 A * | 7/1992 | Scheffler .................. 711/171 |
| 5,148,527 A | 9/1992 | Basso et al. |
| 5,204,954 A | 4/1993 | Hammer et al. |
| 5,544,347 A * | 8/1996 | Yanai et al. .................. 711/162 |
| 5,737,514 A * | 4/1998 | Stiffler ..................... 714/13 |
| 6,038,651 A | 3/2000 | VanHuben et al. |
| 6,170,025 B1 | 1/2001 | Drottar et al. |
| 6,230,241 B1 | 5/2001 | McKenney |
| 6,507,592 B1 | 1/2003 | Hurvig et al. |
| 6,587,921 B2 | 7/2003 | Chiu et al. |
| 6,636,949 B2 | 10/2003 | Barroso et al. |
| 6,772,267 B2 | 8/2004 | Thaler |
| 6,772,416 B1 * | 8/2004 | White et al. ................. 718/102 |
| 7,003,563 B2 | 2/2006 | Leigh et al. |
| 2001/0037422 A1 | 11/2001 | Thaler et al. |
| 2002/0194429 A1 | 12/2002 | Chiu et al. |
| 2003/0009623 A1 * | 1/2003 | Arimilli et al. ............. 711/119 |
| 2003/0088655 A1 | 5/2003 | Leigh et al. |

* cited by examiner

*Primary Examiner*—Tuan V. Thai
(74) *Attorney, Agent, or Firm*—Cesari and McKenna LLP (57) ABSTRACT

A system and method for enabling a processor to access a memory not directly coupled to the processor. A memory request, including a request identifier field, is issued by a processor to a local memory management unit (MMU). Using the request identifier field, the local MMU determines whether the memory request should be issued by the local memory management unit (MMU) to a local memory, or should be transferred by the local MMU to a remote MMU and issued by the remote MMU to a remote memory, the remote memory associated with a different processor. In this manner, the remote MMU issues certain memory requests on behalf of the local processor and returns any results back to the local processor.

23 Claims, 10 Drawing Sheets

FULL ACCESS TO MEMORY INTERFACES VIA REMOTE REQUEST

RELATED APPLICATIONS

This Application for United States Patent is a continuation of U.S. patent application Ser. No. 10/342,039 filed on Jan. 14, 2003 now U.S. Pat. No. 7,047,370 entitled Full Access to Memory Interfaces via Remote Request.

BACKGROUND OF THE INVENTION

1. Field of the Invention

The present invention relates to computer systems and specifically to accessing memory in a computer system.

2. Background Information

Computer architecture generally defines the functional operation, including the flow of information and control, among individual hardware units of a computer. One such hardware unit is the processor or processing engine, which contains arithmetic and logic processing circuits organized as a set of data paths. In some implementations, the data path circuits may be configured as a central processing unit (CPU) having operations that are defined by a set of instructions. The instructions are typically stored in an instruction memory and specify a set of hardware functions that are available on the CPU.

A high-performance computer may be realized by using a number of CPUs or processors to perform certain tasks in parallel. For a purely parallel multiprocessor architecture, each processor may have shared or private access to resources, such as program instructions (e.g., algorithms) or data structures stored in a memory coupled to the processors. Access to the memory is generally handled by a memory management unit (MMU), which accepts memory requests from the various processors and processes them in an order that often is controlled by logic contained in the MMU. Moreover, certain complex multiprocessor systems may employ many MMUs where each memory is associated with its own MMU and the processor is coupled to the memory through its MMU.

In these multiprocessing systems, each processor may need to access data contained in the various memories. One way to accommodate this is to couple each processor to each memory in a fully-meshed crossbar arrangement such that each processor is directly coupled to each memory through its MMU. However, depending on the system and implementation this approach may not be desirable as the number of connections required may be quite numerous and in some cases impractical. For example, a system comprised of sixteen processors and four memories may require 64×2×N connections, where "N" is the width of the bus, in order to accommodate separate read and write bus connections between each processor and memory. In a typical multiprocessor system N is usually some number greater than 32; thus, the number of connections would be 4096 or greater. In some implementations, such as where the multiprocessor systems are contained in a single Application Specific Integrated Circuit (ASIC), such a large number of connections may not be practical.

SUMMARY OF THE INVENTION

The present invention relates to an improved technique for enabling a processor to access a memory without requiring that the processor be directly coupled to the memory. According to the technique, the processor (hereinafter local processor) accesses the memory (hereinafter remote memory) by (i) generating a remote memory request containing an indicator that indicates the request is addressed to the remote memory, and (ii) issuing the remote memory request to a remote memory management unit (MMU). The remote MMU acts as a proxy and issues the remote memory request to the remote memory on behalf of the local processor. The results of the request, if any, are returned to the local processor.

Briefly, in the illustrated embodiment, the local processor is coupled to a local MMU, which in turn is coupled to the remote MMU via a bus. The local processor accesses the remote memory by generating a remote memory request that contains, inter alia, an indicator that indicates that the request is addressed to the remote memory. The local processor then transfers the remote memory request to the local MMU. The local MMU processes the remote memory request including transferring the request over the bus to the remote MMU coupled to the remote memory through a remote memory controller. The remote MMU receives and processes the request including placing the request in a remote request queue. When the request reaches the head of the queue, a state machine contained in the remote MMU determines if remote requests are enabled and if so, transfers the request to an arbiter also contained in the remote MMU. The arbiter processes the remote memory request including determining if a local request has been issued by a remote processor coupled to the remote MMU and if not, issuing the request to the memory controller coupled to the remote memory. The remote MMU then returns the results of the remote memory request, if any, over the bus to the local MMU, which in turn returns, the results to the local processor. Advantageously, the inventive technique enables the local processor to access the remote memory without having to be directly connected to the remote memory.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN
ILLUSTRATIVE EMBODIMENT

Figure 1:
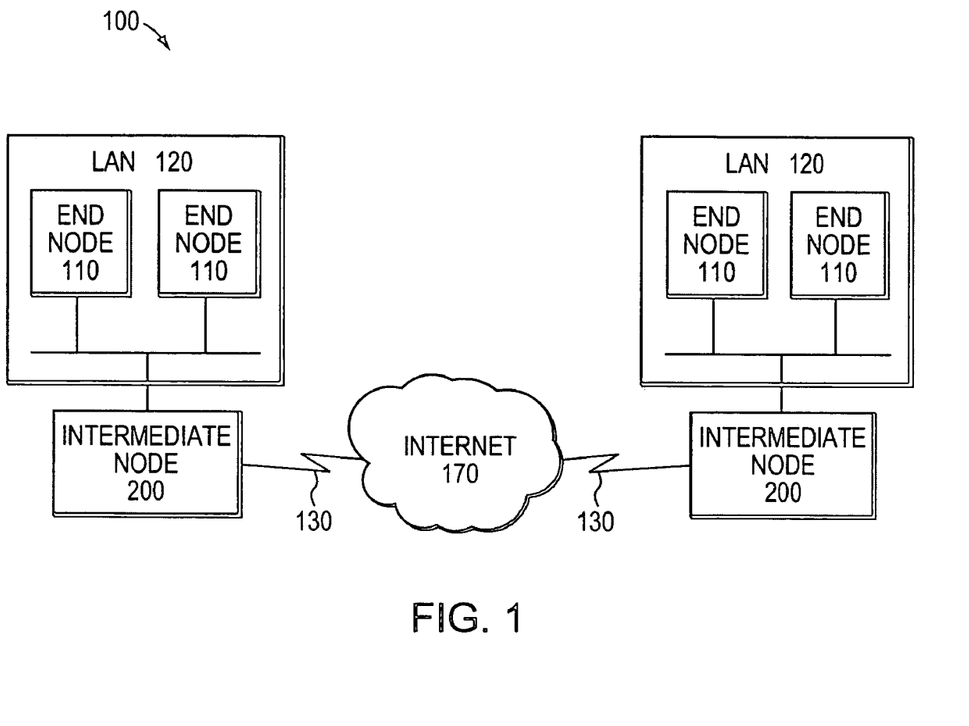
FIG. 1 is a schematic block diagram of a network that may be advantageously used with the present invention.

FIG. 1 is a schematic block diagram of a computer network 100 that may be advantageously used with the present invention. The computer network 100 comprises a collection of communication links and segments connected to a plurality of nodes, such as end nodes 110 and intermediate nodes 200. The network links and segments may comprise local area networks (LANs) 120, wide area networks (WANs) such as Internet 170 and WAN links 130 interconnected by intermediate nodes 200 to form an internetwork of computer nodes. These internetworked nodes communicate by exchanging data packets according to a predefined set of protocols, such as the Transmission Control Protocol/Internet Protocol (TCP/IP) and the Internetwork Packet eXchange (IPX) protocol.

Figure 2:
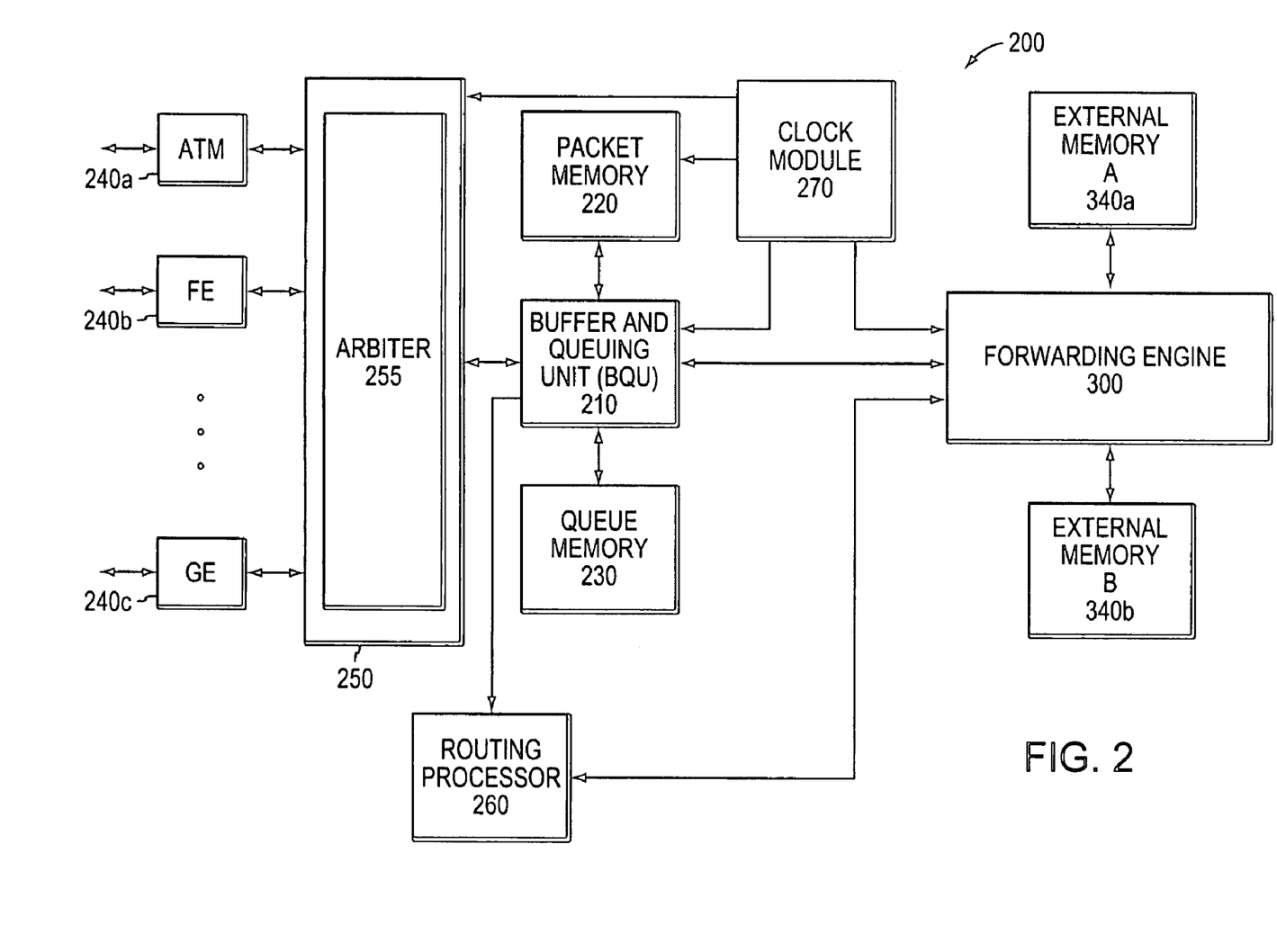
FIG. 2 is a high-level schematic block diagram of an intermediate node that may be advantageously used with the present invention.

FIG. 2 is a high-level schematic block diagram of intermediate node 200, which illustratively is a router. An example of a router that may be advantageously used with the present invention is the Cisco 10000 Series Internet Router available from Cisco Systems Incorporated, San Jose, Calif. Node 200 comprises a plurality of interconnected components including a forwarding engine 300, various memories, queuing logic 210, and network interface cards (line cards) 240. Operations of these components are preferably synchronously controlled by a clock module 270 although the arrayed elements of the forwarding engine 300 may be operatively configured to function asynchronously. In the illustrative embodiment, the clock module 270 generates clock signals at a frequency of, e.g., 200 megahertz (i.e., 5 nanosecond clock cycles), and globally distributes them via clock lines to the components of the intermediate node.

The memories generally comprise random-access-memory (RAM) storage locations addressable by the forwarding engine 300 and logic for storing data structures accessed by the components and software programs including programs that implement aspects of the present invention. An operating system, portions of which are typically resident in memory and executed by the forwarding engine 300, functionally organizes node 200 by, inter alia, invoking network operations in support of software processes executing on node 200. It will be apparent to those skilled in the art that other memory means, including various computer readable mediums, may be used for storing and executing program instructions pertaining to the inventive technique and mechanism described herein.

The buffer and queuing unit (BQU) 210 is connected to a packet memory 220 for storing packets and a queue memory 230 for storing network and link layer headers of the packets on data structures, such as linked lists, organized as queues. The BQU 210 further comprises interface circuitry for interconnecting the forwarding engine 300 with a plurality of line cards 240 via a selector circuit 250 having an arbiter 255. The line cards 240 may comprise, e.g., Asynchronous Transfer Mode (ATM), Fast Ethernet (FE) and Gigabit Ethernet (GE) ports, each of which includes conventional interface circuitry that may incorporate the signal, electrical and mechanical characteristics, and interchange circuits, needed to interface with the physical media and protocols running over that media.

A routing processor 260 executes conventional routing protocols for communication directly with the forwarding engine 300. The routing protocols generally comprise topological information exchanges between intermediate nodes to determine preferred paths through the network based on, e.g., destination IP addresses. These protocols provide information used by the processor 260 to create and maintain forwarding tables. The tables are loaded into the external memories 340 as forwarding information base (FIB) tables, used by the engine 300 to perform, e.g., layer-2 (L2) and layer-3 (L3) forwarding operations. When processing a header in accordance with IP routing, for example, engine 300 determines where to send the packet by indexing into the FIB using an IP address of the header. Execution of the forwarding operations results in destination media access control (MAC) addresses of the headers being rewritten by the forwarding engine 300 to identify output ports for the packets.

Figure 3:
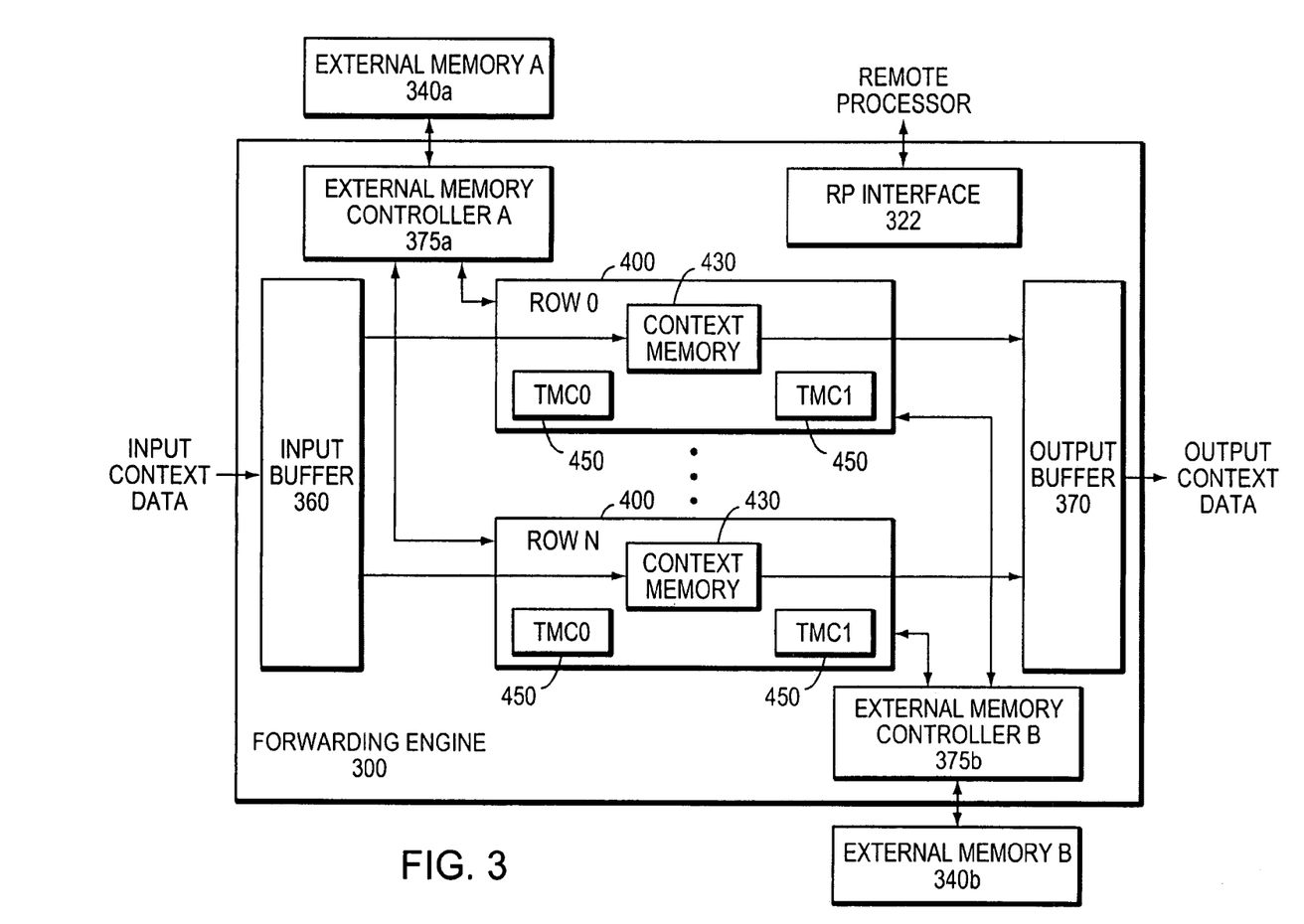
FIG. 3 is a partial schematic block diagram of a forwarding engine comprising a plurality of processors coupled to a plurality of external memories that may be advantageously used with the present invention.

The forwarding engine 300 may comprise a symmetric multiprocessor system having a plurality of processing elements or processors. FIG. 3 is a partial schematic block diagram of forwarding engine 300 comprising a plurality of processors (TMCs) 450 organized as a multi-dimensional systolic array. Each processor 450 is preferably a pipelined processor that includes, inter alia, a plurality of arithmetic logic units (ALUs) and a register file having a plurality of general purpose registers that store intermediate result information processed by the ALUs. The processors 450 may be arrayed into multiple rows and columns. In the illustrative embodiment, the processors are arrayed as eight (8) rows and two (2) columns in an 8×2 arrayed configuration that is embedded between an input buffer 360 and an output buffer 370. However, it should be noted that other arrangements, such as 4×4, 8×2, or 8×1 arrayed configurations, might be advantageously used with the present invention. As noted herein, a single processor supporting multiple threads of execution can take advantage of the invention.

The forwarding engine 300 is coupled to a plurality of external memory resources 340 via memory controllers 375. The external memory 340 is preferably organized as one or more banks and implemented using fast-cycle-random-access-memory (FCRAM) devices, although other devices, such as reduced-latency-dynamic-random-access-memory (RLDRAM) devices, could be used. The external memory 340 stores non-transient data (e.g., forwarding tables, queues) organized as a series of data structures for use in processing transient data (e.g., packets). Each external memory 340 is coupled to a memory controller 375 that contains logic that enables access to memory locations contained in the associated external memory 340. As used herein, a memory subsystem comprises an external memory 340 and its associated memory controller 375. The processors 450 of a column are coupled to a particular external memory subsystem. Thus, for example, the processors of column one (i.e., TMC1 in rows zero through N) are directly coupled to an external memory subsystem comprising external memory controller B 375b and external memory B 340b.

Figure 4:
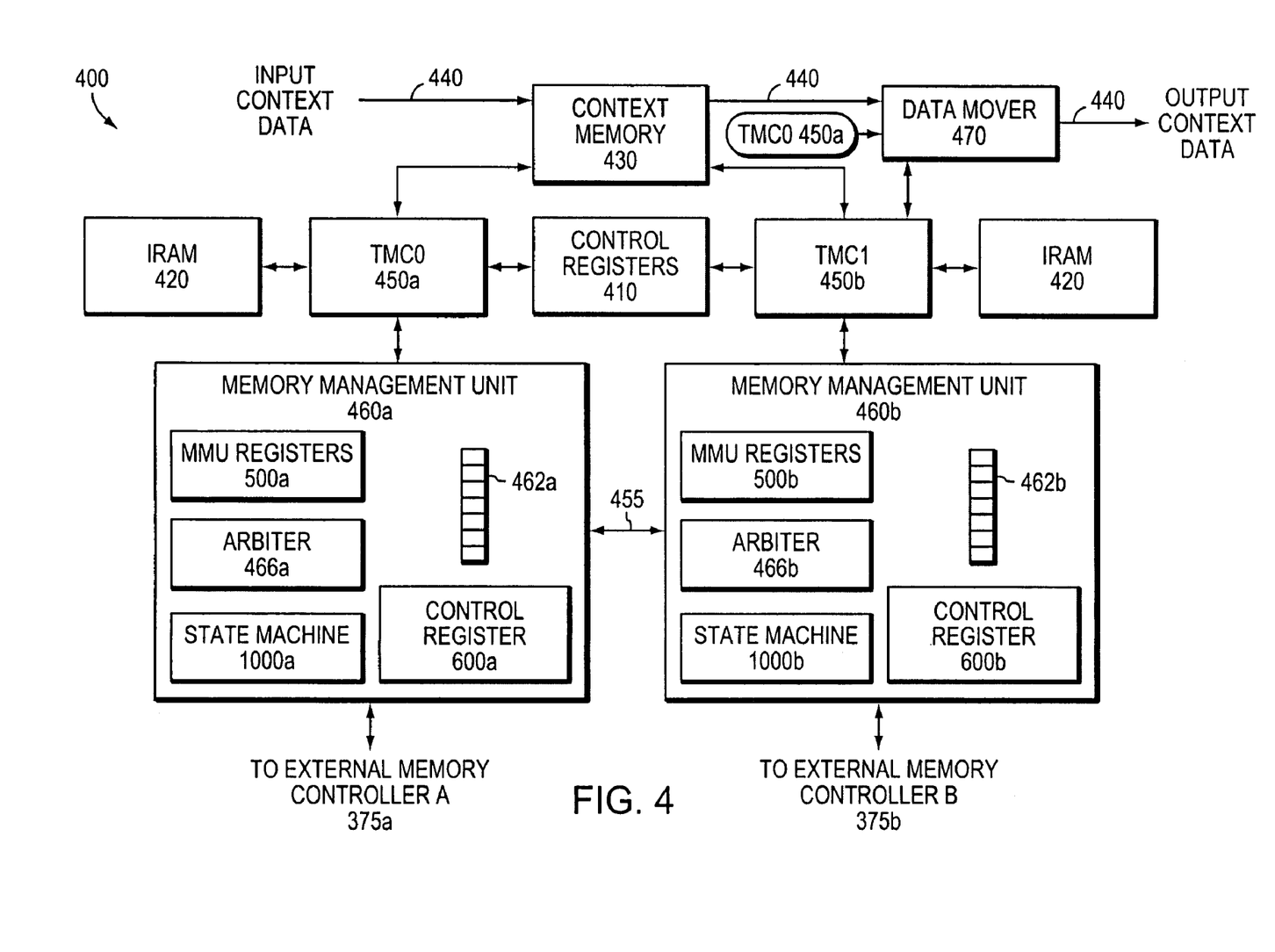
FIG. 4 is a schematic block diagram of a processor cluster comprising a plurality of processors each coupled to a memory management unit (MMU) that may be advantageously used with the present invention.

The processors 450 of a row are organized as a cluster 400 containing a context memory 430 configured to hold context information (e.g., packet headers) processed by the processors 450. FIG. 4 is a schematic block diagram of a cluster 400. Each processor (TMC) 450 of the cluster is coupled to an instruction memory (IRAM) 420 configured to store instructions for execution by the processor, a control registers unit 410, the context memory 430 and a memory management unit (MMU) 460, the latter configured to, inter alia, enable the processors 450 to access the external memories 340 through the external memory's controller 375.

As noted, the processors 450 of each cluster 400 execute operations on transient data loaded into the context memory 430 by the input buffer 360, whereas the processors of each column operate in parallel to perform substantially the same operation on the transient data, but with a shifted phase. Transient (context) data are passed between the input and output buffers of the engine 300 over a data path channel 440 provided by a data mover circuit 470 coupled to the processor 450. The context data flowing through the cluster 400 is stored in the context memory 430 along with pointers that reference data structures and tables stored in, e.g., external memory 340, for use by the processor 450.

Each MMU 460 comprises logic used to, inter alia, process memory requests issued by the processors 450 in accordance with the inventive technique. This logic includes a remote request queue 462, arbiter 466, a state machine 1000, MMU registers 500, and a control register 600. The remote request queue 462 is illustratively a first-in-first-out (FIFO) queue that holds (remote) memory requests received over a remote request bus 455. For example, queue 462b holds memory requests issued by processor 450a and transferred from MMU 460a over bus 455 to MMU 460b. State machine 1000 comprises various combinatorial and sequential logic configured to implement a conventional state machine that, inter alia, processes requests placed in queue 462. Arbiter 466 contains logic configured to process requests including arbitrating between "local" memory requests issued by the processor 450 directly coupled to the MMU 460 and remote memory requests at the head of the remote request queue 462, and issuing requests to the external memory controller 375. Illustratively, when processing memory requests arbiter 466 is configured to grant priority to local memory requests over remote memory requests. Thus, if both a local memory request and a remote memory request are available for processing at the same time, the arbiter 466 processes the local memory request first, stalls the remote memory request at the head of queue 462 until the local request has been processed, then processes the remote request.

Figure 5:
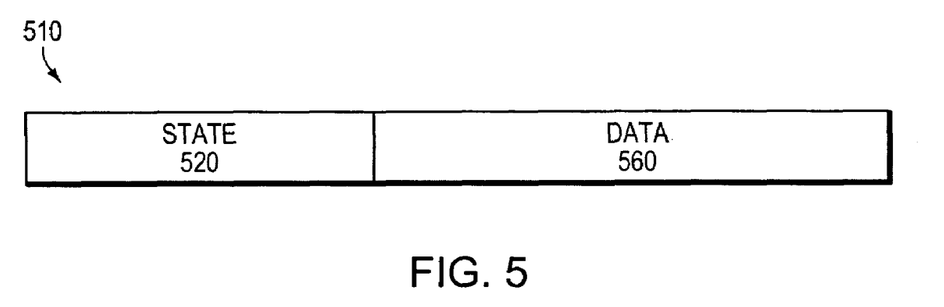
FIG. 5 is a schematic block diagram of a memory management unit (MMU) register that may be advantageously used with the present invention.

The MMU registers 500 hold state and data associated with illustratively up to eight (8) outstanding memory operations (e.g., read, write) where each outstanding operation is associated with a register. FIG. 5 is a schematic block diagram of an MMU register 510 that may be advantageously used with the present invention. Register 510 comprises a state field 520 and a data field 560. The state field 520 holds internal state information maintained by the MMU 460, such as a memory operation (e.g., read, write) and an amount of data (e.g., in bytes). The data field 560 holds data that, depending on the memory operation, are read from or written to the external memory 340. In the illustrated embodiment, the registers are numbered from zero to seven.

Figure 6:
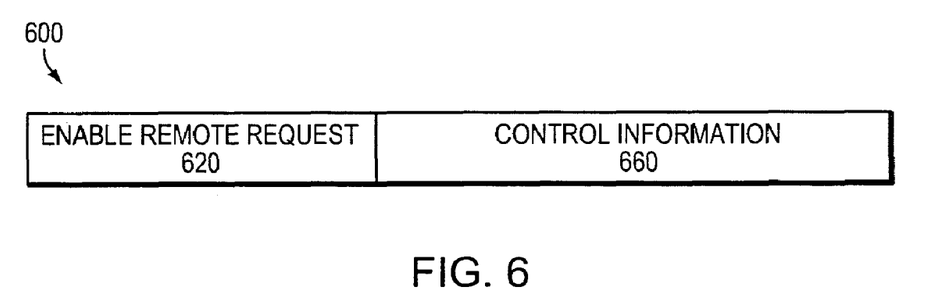
FIG. 6 is schematic block diagram of a control register that may be advantageously used with the present invention.

The control register 600 holds information that controls whether remote requests are "enabled" (i.e., processed by the MMU 460) or "not enabled" (i.e., stalled by the MMU 460). FIG. 6 is a schematic block diagram of control register 600 that may be advantageously used with the present invention. Register 600 comprises an enable remote request field 620 and a control information field 660. The control information field 660 holds various configuration information associated with configuring the MMU 460. The enable remote request field 620 holds an indicator that is used to determine whether remote requests that reach the head of the remote request queue 462 are processed or stalled by the MMU 460. Specifically, if the indicator 620 is set to indicate "enable remote requests," the state machine 1000 processes the request by removing the request from the queue 462 and issuing the request to the arbiter 466. Otherwise, if the indicator 620 is set to indicate "do not enable remote requests," the state machine 1000 stalls the request at the head of the queue 462 until the indicator 620 is set to enable remote requests. Illustratively, the enable remote request field 620 is a 1-bit field that holds a value of one to indicate "enable remote requests" and a zero to indicate "do not enable remote requests."

Figure 7:
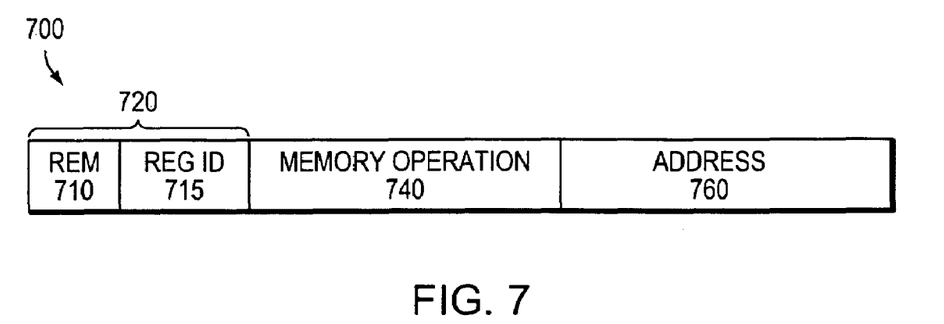
FIG. 7 is a schematic block diagram of a memory request that may be used with the present invention.

Local processors 450 access the external memories 340 by issuing memory requests to the MMU 460 coupled to each local processor 450. FIG. 7 is a schematic block diagram of a memory request that may be advantageously used with the present invention. Request 700 comprises a request identifier (ID) field 720, a memory operation field 740, and an address field 760. The memory operation field 740 holds a memory operation (e.g., read, write) to be performed on a memory location specified in the memory address field 760.

The request ID field 720 is illustratively a 4-bit field comprising a remote request field 710 and a register (REG) ID field 715. The REG ID field 715 is illustratively a 3-bit field that holds a value that designates an MMU register 510 associated with the request. The remote request (REM) field 710 indicates whether the request is a local memory request, i.e., a request addressed to a local MMU, or a remote memory request, i.e., a request addressed to a remote MMU. A local MMU is an MMU directly coupled to the processor 450 issuing the request, whereas a remote MMU is an MMU not directly coupled to the processor 450 issuing the request. Illustratively, field 710 is a 1-bit field that if cleared, e.g., a zero, indicates the request is a local memory request and if set, e.g., a one, indicates the request is a remote memory request. Thus, for example, a request 700 issued by processor 450a where the REM field 710 is cleared and the REG ID field 715 contains a value of one is a local request that is addressed to MMU 460a and designates MMU register 1 in the local MMU's registers 500a. Likewise, a request 700 issued by processor 450a where the REM field 710 is set and the REG ID field 715 contains a value of one is a remote memory request that is addressed to MMU 460b and designates MMU register 1 in remote MMU's registers 500b.

The present invention relates to an improved technique for enabling a processor to access a memory without requiring that the processor be directly coupled to the memory. According to the technique, the processor ("local" processor) accesses the memory ("remote" memory) by issuing a remote memory request containing an indicator that indicates the request is addressed to the remote memory. In this context, a remote memory request is a memory request that accesses a memory not directly coupled to the local processor. The request is transferred to a remote MMU coupled to the remote memory. The remote MMU issues the remote memory request to the remote memory on behalf of the local processor and returns the results of the request, if any, to the local processor.

Figure 8A:
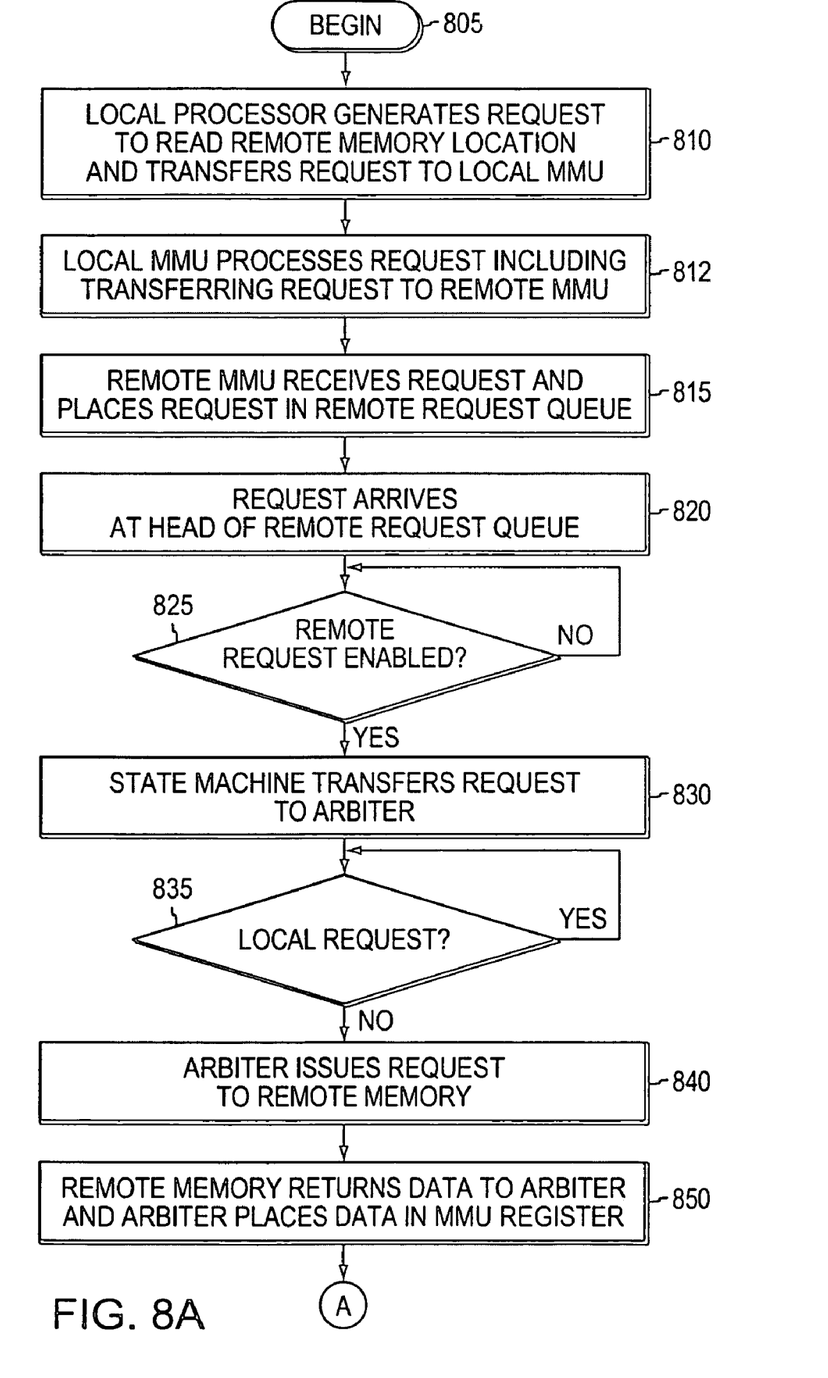
FIGS. 8A-8B are flow diagrams of a sequence of steps that may be used to process a memory read operation in accordance with the inventive technique.
Figure 8B:
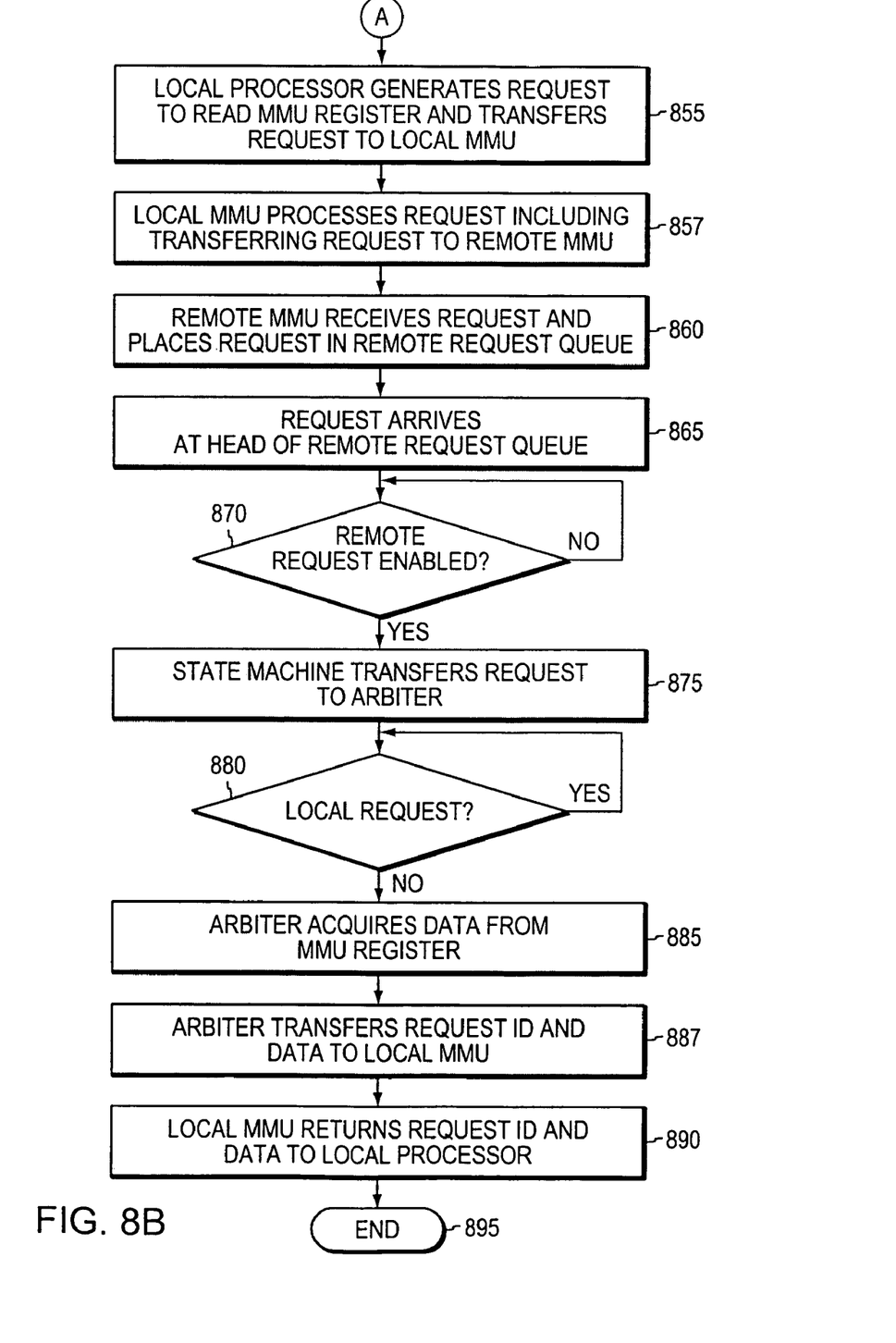

In the illustrated embodiment, a local processor reads the contents of a remote memory location by (i) issuing a remote memory request that places the contents of the remote memory location into a remote MMU register (i.e., an MMU register contained in the remote MMU's MMU registers 500) then (ii) issuing another remote memory request to read the contents of the remote MMU register. Suppose processor 450*a* issues requests to read the contents of a remote memory location in external memory B 340*b* that maps to memory address 100. FIGS. 8A-B are a flow chart of a sequence of steps that may be used to read the contents of a remote memory location in accordance with the inventive technique. The sequence begins at Step 805 and proceeds to Step 810 where processor 450*a* (local processor) generates a remote memory request 700 (remote request) to read the contents, of the memory location in remote memory 340*b* that maps to location 100, into remote MMU register 1 in the remote MMU registers 500*b*. Specifically, processor 450*a* generates the remote memory request 700 including setting the REM field 710, designating remote MMU register 1 (i.e., a value of 1) in the request REG ID field 715, designating a read operation in the memory operation field 740, and placing a value of 100 in the address field 760 of the request 700. The processor 450*a* then transfers the remote request 700 to MMU 460*a* (local MMU). MMU 460*a* processes the remote request 700 including examining the REM field 710 to determine if the request is a local request or a remote request, concluding the request is a remote request (i.e., addressed to MMU 460*b*), and transferring the request over bus 455 to MMU 460*b* (remote MMU) as indicated at Step 812.

At Step 815, MMU 460*b* receives the remote request 700 and places the request at the end (tail) of the remote request queue 462*b*. When the remote request 700 reaches the head of the queue 462*b* (Step 820), state machine 1000*b* processes the request 700 including examining the enable remote request field 620 contained in control register 600*b* to determine if remote requests are enabled, as indicated at Step 825. If remote requests are not enabled, the state machine 1000*b* stalls the remote request 700 at the head of queue 462*b* and the sequence returns to Step 825; otherwise, the sequence proceeds to Step 830. Assume that remote requests are enabled. At Step 830, the state machine 1000*b* transfers the remote request 700 to the arbiter 466*b*.

Arbiter 466*b* then determines if a local memory request 700 issued by processor 450*b* is also available to be processed (Step 835). If so, the sequence returns to Step 835 and the remote request 700 is stalled until the local request has been processed; otherwise, the sequence proceeds to Step 840. Assume processor 450*b* has not issued a local memory request. At Step 840, the arbiter issues the remote request 700 to the remote memory 340*b* by transferring the request to the external memory controller B 375*b* which processes the request including issuing the request to external memory B 340*b* to acquire the contents of the memory location that maps to location 100. At Step 850, the external memory B 340*b* returns the memory contents (data) to the external memory controller 375*b* which, in turn, transfers the data to the MMU 460*b* where the data is placed into the data field 560 of remote MMU register 1.

At Step 855 (FIG. 8B), local processor 450*a* generates a remote memory request 700 (remote request) to acquire the contents of remote MMU register 1. Specifically, processor 450*a* generates the remote memory request 700 including setting the REM field 710, designating remote MMU register 1 in the request REG ID field 715, designating a register read operation in the memory operation field 740, and placing a value of 100 in the address field 760 of the request 700. Processor 450*a* then transfers the remote request to MMU 460*a*. MMU 460*a* processes the remote request 700 including examining the REM field 710 to determine if the request 700 is a local request or a remote request, concluding the request 700 is a remote request, and transferring the request over bus 455 to MMU 460*b* (Step 857).

At Step 860, MMU 460*b* receives the remote request 700 and processes it including placing the request into remote request queue 462*b*. When the remote request reaches the head of the queue 462*b*, as indicated at Step 865, the state machine 1000*b* determines, in a manner as described above, if remote requests are enabled, as indicated at Step 870. If remote request requests are not enabled, the state machine 1000*b* stalls the remote request 700 at the head of queue 462*b* and the sequence returns to Step 870; otherwise, the sequence proceeds to Step 875. Assume remote requests are enabled. At Step 875, the state machine 1000*b* transfers the remote request to arbiter 466*b*.

At Step 880, arbiter 466*b* determines if processor 450*b* has issued a local request 700, in a manner as described above, and if so, the remote request 700 is stalled and the sequence returns to Step 880; otherwise, the sequence proceeds to Step 885. Assume processor 450*b* has not issued a local memory request 700. At Step 885, arbiter 466*b* acquires the contents of the data field 560 of remote MMU register 1 (data) and transfers the data and the remote request's request ID 720 over bus 455 to MMU 460*a* (Step 887). At Step 890, MMU 460*a* transfers the data and remote request's request ID 720 to processor 450*a*. The sequence ends at Step 895.

Figure 9A:
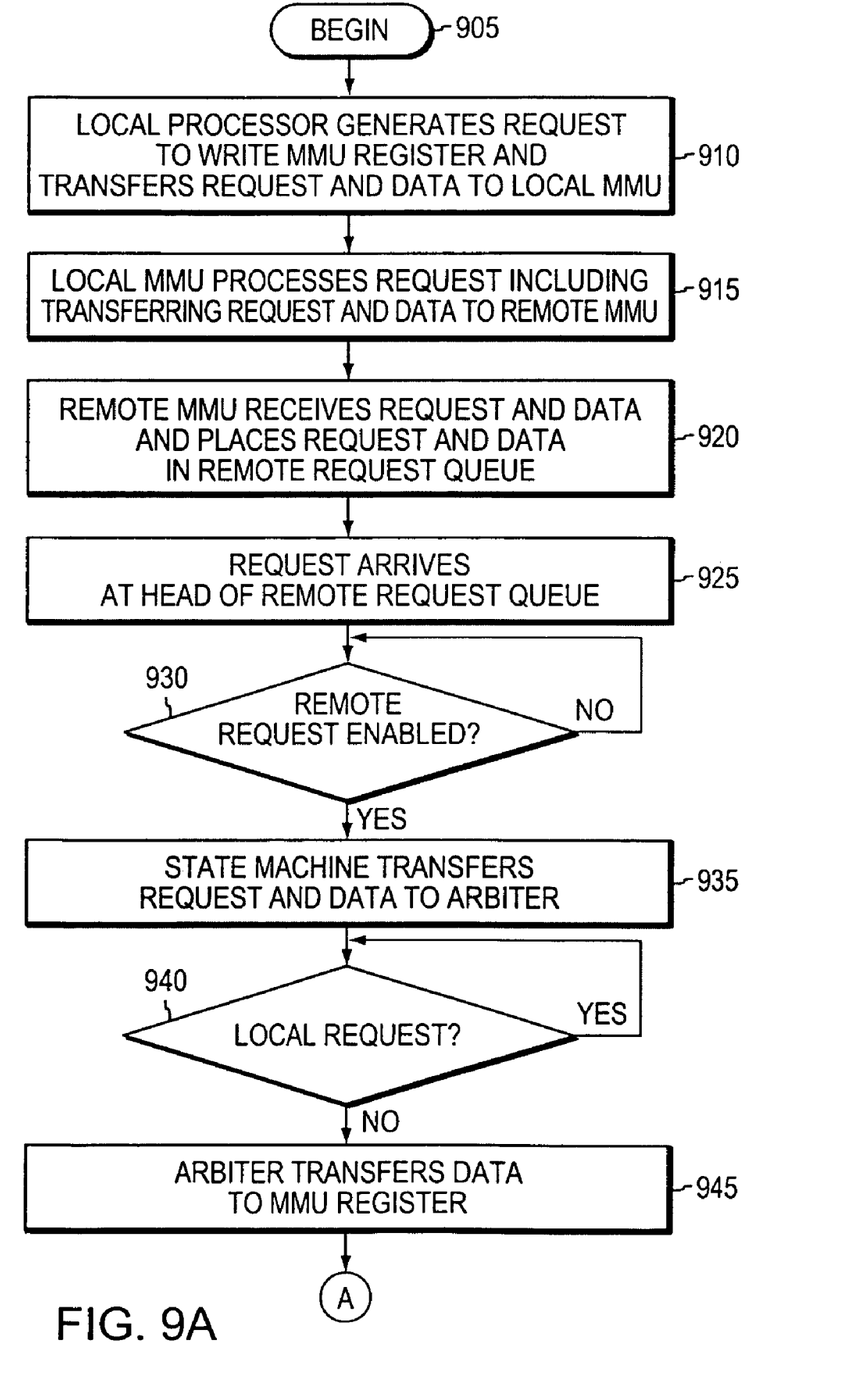
FIGS. 9A-9B are flow diagrams of a sequence of steps that may be used to process a memory write operation in accordance with the inventive technique.
Figure 9B:
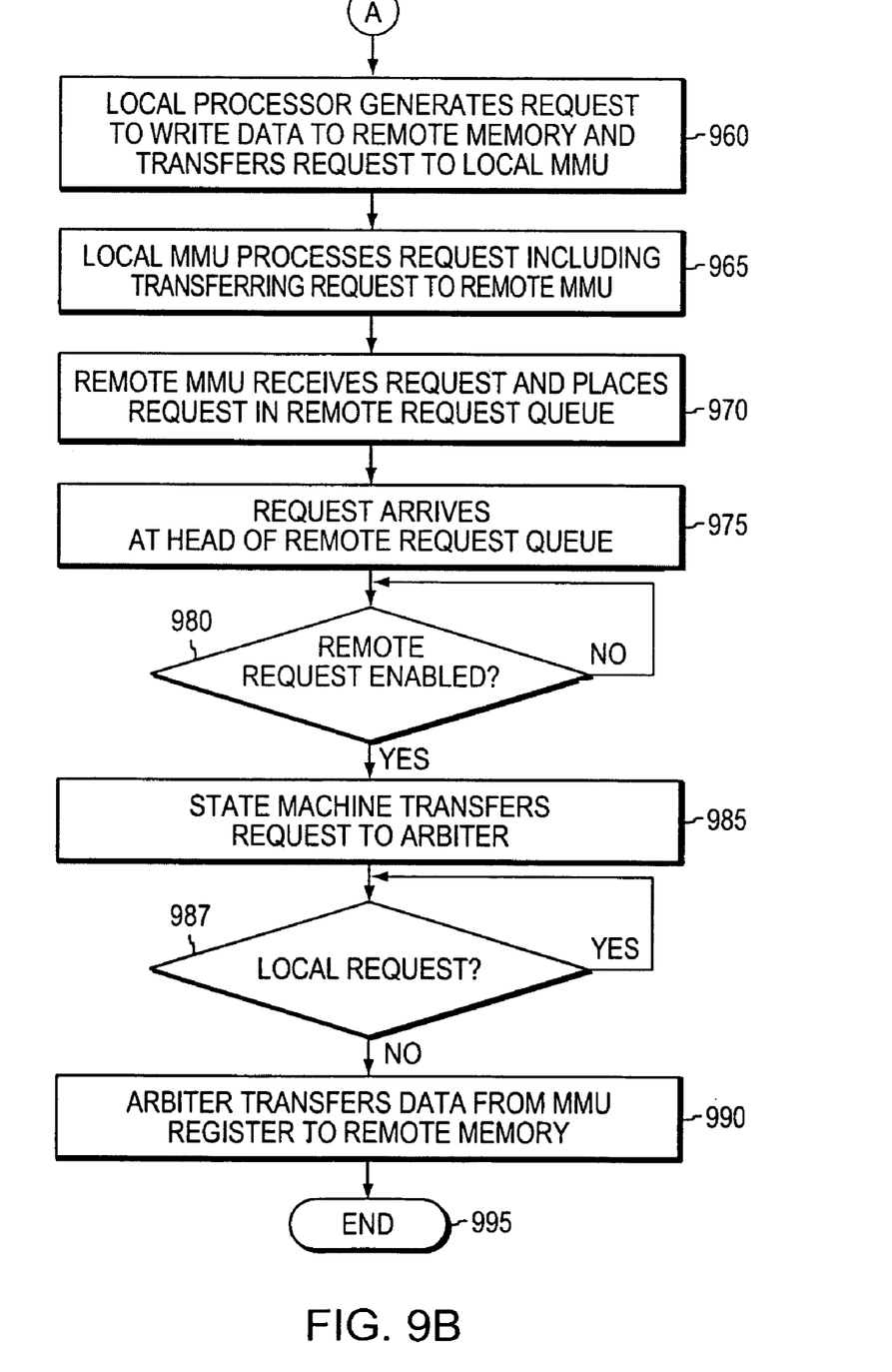

In the illustrated embodiment, a processor writes data to a remote memory location by (i) issuing a request to write the data into a remote MMU register then (ii) issuing another request to write the data from the remote MMU register to the remote memory location. Suppose processor 450*a* issues requests to write data into a memory location in external memory B 340*b* that maps to memory address 100. FIGS. 9A-B are a flow chart of a sequence of steps that may be used to write data into a remote memory location in accordance with the inventive technique. The sequence begins at Step 905 and proceeds to Step 910 where processor 450*a* (local processor) generates a remote memory request 700 to write the data into remote MMU register 1 in MMU registers 500*b*. Specifically, processor 450*a* generates the remote memory request 700 including setting the REM field 710, designating remote MMU register 1 (i.e., a value of 1) in the request REG ID field 715, designating a write register operation in the memory operation field 740, and placing a value of 100 in the address field 760 of the request 700. Processor 450*a* then transfers the remote request 700 and data to be written to remote MMU register 1 to MMU 460*a* (local MMU). MMU 460*a* processes the remote request 700 including examining the REM field 710 to determine if the request 700 is a local request or a remote request, concluding the request 700 is a remote request, and transferring the request and data over bus 455 to MMU 460*b* (remote MMU), as indicated at Step 915.

Next, at Step 920, MMU 460*b* receives the remote request 700 and data and places the request and data at the end (tail) of remote request queue 462*b*. When the remote request 700 and data reaches the head of the remote request queue 462*b* (Step 925), state machine 1000*b* processes the request 700 including checking the enable remote request field 620 of control register 600*b* to determine if remote requests are enabled, as indicated at Step 930. If remote requests are not enabled, state machine 1000*b* stalls the request 700 at the head of queue 462*b* and the sequence returns to Step 930; otherwise, the sequence proceeds to Step 935. Assume remote requests are enabled. At Step 935, the state machine 1000*b* transfers the remote request 700 and data to the arbiter 466*b*.

Arbiter 466*b* then determines if a local memory request 700 issued by processor 450*b* is also available to be processed (Step 940). If so, the sequence proceeds to Step 940 and the remote request 700 is stalled until the local request has been processed; otherwise, the sequence proceeds to Step 945. Assume processor 450b has not issued a local request. At Step 945, the arbiter 466b transfers the data associated with the remote request 700 to the data field 560 of remote MMU register 1.

At Step 960 (FIG. 9B), processor 450a generates a remote memory request 700 to write the data contained in remote MMU register 1 into address 100 of external memory B 340b. Specifically, processor 450a generates the remote memory request 700 including setting the REM field 710, designating remote MMU register 1 in the request REG ID field 715, designating a write operation in the memory operation field 740, and placing a value of 100 in the address field 760 of the request 700. Processor 450a then transfers the generated remote request 700 to MMU 460a. MMU 460a processes the remote request 700 including examining the REM field 710 to determine if the request 700 is a local request or a remote request, concluding the request 700 is a remote request (i.e., addressed to MMU 460b), and transferring the request 700 over bus 455 to MMU 460b (remote MMU), as indicated at Step 965.

At Step 970, MMU 460b receives the remote request 700 and processes it including placing the request 700 on remote request queue 462b, in a manner as described above. When the remote request 700 reaches the head of the queue, as indicated at Step 975, and the state machine 1000b determines, in a manner as described above, if remote requests are enabled, as indicated at Step 980. If remote requests are not enabled, the state machine 1000b stalls the remote request 700 at the head of queue 462b and the sequence returns to Step 980; otherwise, the sequence proceeds to Step 985. Assume remote requests are enabled. At Step 985, the state machine 1000b transfers the remote request 700 to arbiter 466b.

At Step 987, the arbiter 466b determines if processor 450b has issued a local memory request. If so, the remote request 700 is stalled, as described above, and the sequence returns to Step 987; otherwise, the sequence proceeds to Step 990. Assume processor 450b has not issued a local memory request. At Step 990, the arbiter 466b issues the remote request 700 to the remote memory 340 including transferring the request 700 and the contents of the data field 560 from remote MMU register 1 to the memory controller 375b. The memory controller 375b processes the request including transferring the data to the memory location in external memory B 340b that maps to memory location 100. The sequence then ends at Step 995.

Figure 10:
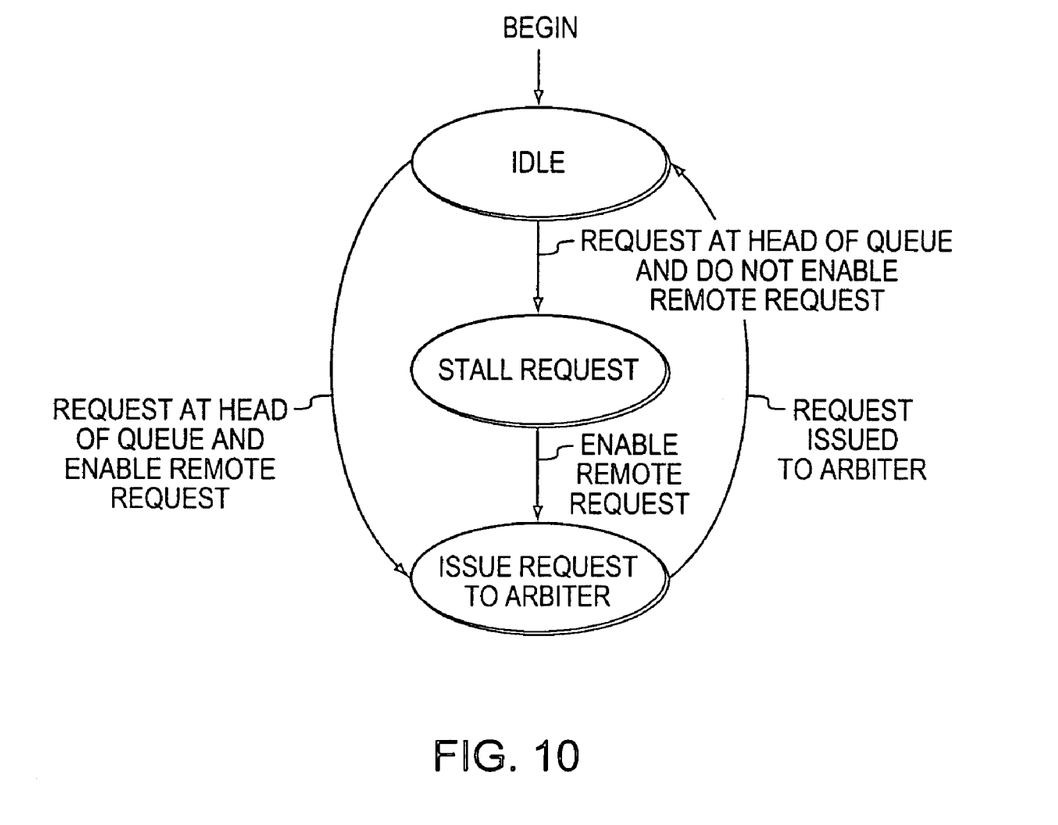
FIG. 10 is a state diagram of a memory management unit (MMU) state machine that may be advantageously used with the present invention.

FIG. 10 is a state diagram of a memory management unit (MMU) state machine 1000 that may be advantageously used with the present invention. The state machine 1000 begins in an "idle" state. When a remote request 700 reaches the head of the remote request queue 462, and if the enable remote request field 620 of the control register 600 indicates enable remote requests, the state machine 1000 proceeds to the "issue the request to the arbiter" state and issues the request 700 to the arbiter 466, as described above. Otherwise, the state machine 1000 proceeds to the "stall request" state and remains in that state until the remote request field 620 indicates enable remote requests, at which time it proceeds to the "issue request to arbiter" state. At the "issue the request to arbiter state," after the request 700 has been issued to the arbiter 466, the state machine 1000 proceeds from the "issue request to arbiter" state to the "idle" state.

While there has been shown and described an illustrative embodiment of accessing a memory without requiring that a processor be directly coupled to the memory, it is to be understood that various other adaptations and modifications may be made within the spirit and scope of the invention. For example, the novel technique has the capability of obviating the effects of a cold-start problem associated with certain multiprocessor systems, such as the systolic array described above by having the data "prefetched" by another processor. The cold-start problem occurs when a processor has to wait an extraordinary number of processor cycles because data is not readily available to the processor when the processor is ready to use the data.

In one adaptation, a local processor can "prefetch" data for a remote processor contained in the remote processor's memory by issuing remote requests containing read memory operations, as described above, to read the data into the remote processor's MMU registers before the remote processor needs the data. Likewise, if the local processor has the data, it can transfer the data to the remote processor by issuing remote requests containing write register memory operations, as described above, to write the data into the remote processor's MMU registers. Moreover, if the remote processor has the data in its MMU registers, the local processor can acquire the data by issuing remote requests containing register read memory operations to read the remote processor's MMU, thereby saving time having to read the data from the remote memory.

The foregoing description has been directed to specific embodiments of this invention. It will be apparent that other variations and modifications may be made to the described embodiments, with the attainment of some or all of their advantages. Therefore, it is an object of the appended claims to cover all such variations and modifications as come within the true spirit and scope of the invention.

What is claimed is:

1. A memory request stored in a computer readable medium, the memory request used by a local processor to access a remote memory that is not directly coupled to the local processor, the memory request comprising:
   a memory operation field configured to specify that a memory operation to be performed;
   a memory address field configured to specify a memory location on which the memory operation is to be performed; and
   a request identifier (ID) field configured to specify whether the memory request is to be issued by a local memory management unit (MMU) to a local memory associated with the local processor, or is to be transferred by the local MMU to a remote MMU and issued by the remote MMU to the remote memory, the remote memory associated with a processor other than the local processor.

2. The memory request of claim 1 wherein the request ID field further comprises:
   a register (REG) identifier (ID) field configured to designate an MMU register to store data associated with the memory request.

3. The memory request of claim 1 wherein the request ID field further comprises:
   a remote request (REM) field configured to designate a specific MMU for issuing the memory request.

4. The memory request of claim 1 wherein the a memory operation field is further configured to specify that the memory operation is a read operation, and wherein the memory request causes data to be read from the remote memory by the remote MMU and to be transferred from the remote MMU to the local MMU, for use thereafter by the local processor.

5. The memory request of claim 1 wherein the a memory operation field is further configured to specify that the memory operation is a write operation, and wherein the memory request causes data to be transferred from the local MMU to the remote MMU and to be written by the remote MMU to the remote memory.

6. A method for a local processor to access a remote memory that is not directly coupled to the local processor, the method comprising the steps of
configuring a memory operation field of a memory request to specify a memory operation to be performed;
configuring a memory address field of the memory request to specify a memory location on which the memory operation is to be performed; and
configuring a request identifier (ID) field of the memory request to specify whether the memory request is to be issued by a local memory management unit (MMU) to a local memory associated with the local processor, or is to be transferred by the local MMU to a remote MMU and issued by the remote MMU to the remote memory, the remote memory associated with a processor other than the local processor.

7. The method of claim 6 wherein the step of configuring a request identifier (ID) field further comprises the step of:
configuring a register (REG) identifier (ID) field to designate an MMU register to store data associated with the memory request.

8. The method of claim 6 wherein the step of configuring a request identifier (ID) field further comprises the step of:
configuring a remote request (REM) field to designate a specific MMU associated with the memory request.

9. The method of claim 6 wherein the remote MMU is coupled to the remote memory, the local MMU is coupled to the local memory, and the local MMU is couple to the remote MMU.

10. The method of claim 6 further comprising the steps of:
sending the memory request by the local processor to the local MMU; and
determining, by the local MMU, whether to issue the memory request to the local memory or to transfer the memory request to the remote MMU, in response to the request ID field.

11. The method of claim 10 further comprising the steps of:
determining, by the remote MMU, if remote memory requests are enabled; and
if remote memory requests are not enabled, stalling the memory request at the remote MMU until remote memory requests are enabled.

12. The method of claim 11 wherein the step of determining if remote memory requests are enabled further comprises the step of:
reading the contents of a control register of the remote MMU, the control register storing an indicator for remote memory requests.

13. The method of claim 10 further comprising the step of:
determining, by the remote MMU, if remote memory requests are enabled; and
if remote memory requests are enabled, transferring the memory request to an arbiter of the remote MMU.

14. The method of claim 13 further comprising the step of:
issuing the memory request at a time determined by the arbiter, the arbiter giving preference to memory requests received from processors coupled directly to the remote MMU over memory requests received from other MMUs.

15. The method of claim 6 wherein the memory operation field specifies that the memory operation is a read operation, and the method further comprises the steps of:
reading data from the remote memory by the remote MMU;
transferring the data from the remote MMU to the local MMU; and
storing the data in a register of the local MMU, the register accessible by the local processor.

16. The method of claim 6 wherein the memory operation field specifies that the memory operation to is a write operation, and the method further comprises the steps of:
transferring the data to be written to the remote memory from the local MMU to the remote MMU;
storing the data in a register of the remote MMU; and
writing, by the remote MMU, the data to the remote memory.

17. A memory request stored in a computer readable medium, the memory request used by a local processor to access a remote memory that is not directly coupled to the local processor, the memory request comprising:
means for specifying a memory operation to be performed;
means for specifying a memory location on which the memory operation is to be performed; and
means for specifying whether the memory request is to be issued by a local memory management unit (MMU) to a local memory associated with the local processor, or is to be transferred by the local MMU to a remote MMU and issued by the remote MMU to the remote memory, the remote memory associated with a processor other than the local processor.

18. The memory request of claim 17 further comprising:
means for designating an MMU register to store data associated with the memory request.

19. The memory request of claim 17 further comprising:
means for designating a specific MMU for issuing the memory request.

20. The memory request of claim 17 wherein the means for specifying a memory operation to be performed specify that the memory operation is a read operation, and wherein the memory request causes data to be read from the remote memory by the remote MMU and to be transferred from the remote MMU to the local MMU, for use thereafter by the local processor.

21. The memory request of claim 17 wherein the means for specifying a memory operation to be performed specify that the memory operation is a write operation, and wherein the memory request causes data to be transferred from the local MMU to the remote MMU and to be written by the remote MMU to the remote memory.

22. A method for a first processor to access a remote memory that is not directly coupled to the first processor to prefetch data for use by a second processor, the method comprising the steps of:
sending the memory request by the first processor to a first memory management unit (MMU) coupled to the first processor;
transmitting the memory request by the first MMU unit to a second MMU, the second MMU coupled to both the second processor and to an external memory associated with the second processor;
issuing the memory request by the second MMU to the external memory;
storing data returned in response to the memory request in one or more registers of the second MMU, such that the data will be available to the second processor absent additional accesses to the external memory.

23. The method of claim 22 wherein the memory request includes a memory operation field configured to specify that a read operation is to be performed, a memory address field configured to specify a memory location from which to read, and a request identifier (ID) field configured to specify that the memory request is to be issued by the second MMU.

* * * * *